Feb. 16, 1937. O. U. ZERK 2,070,819
TIRE COVER
Filed July 23, 1931 2 Sheets-Sheet 1
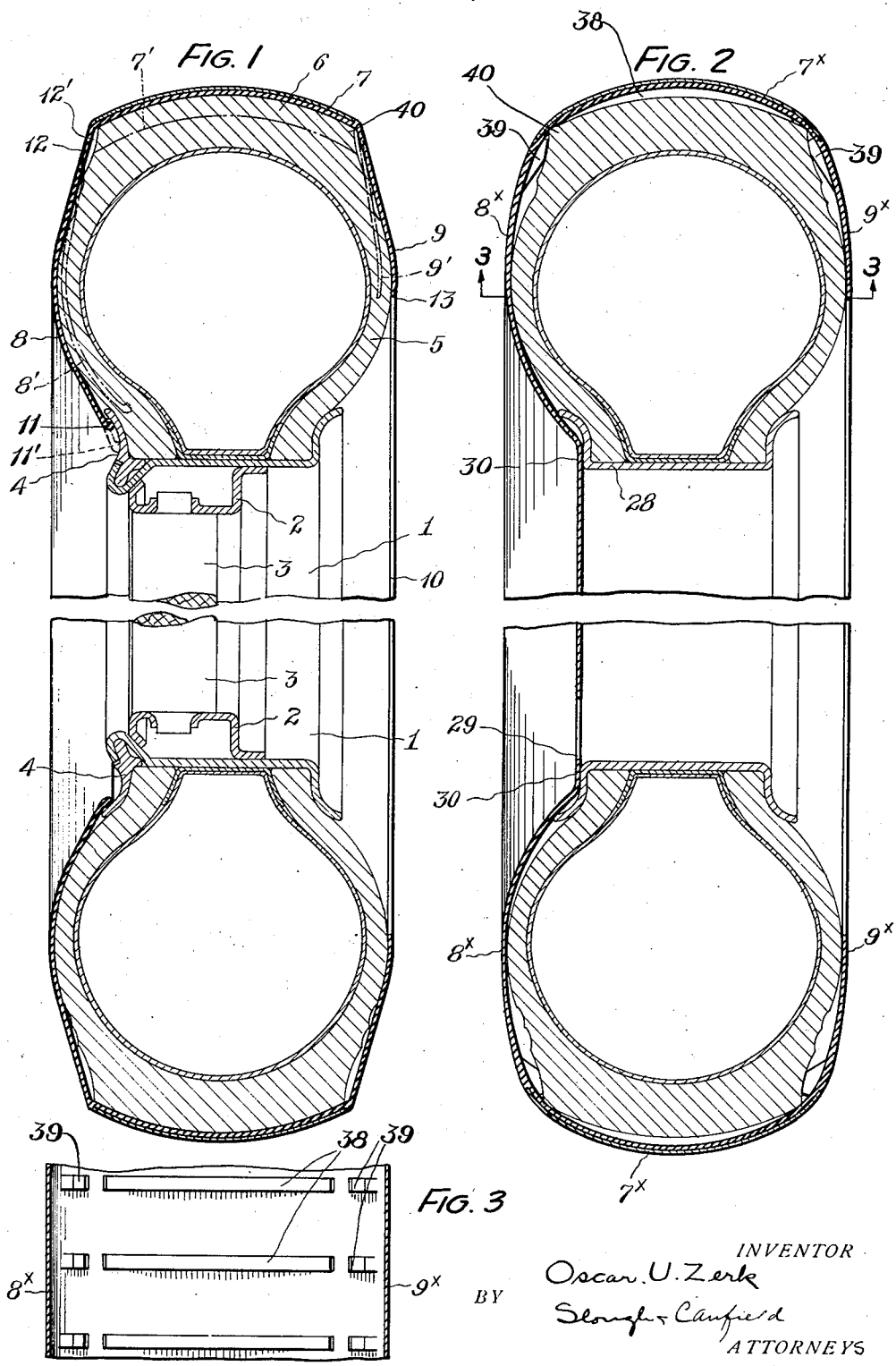
INVENTOR
Oscar U. Zerk
BY Slough + Canfield
ATTORNEYS

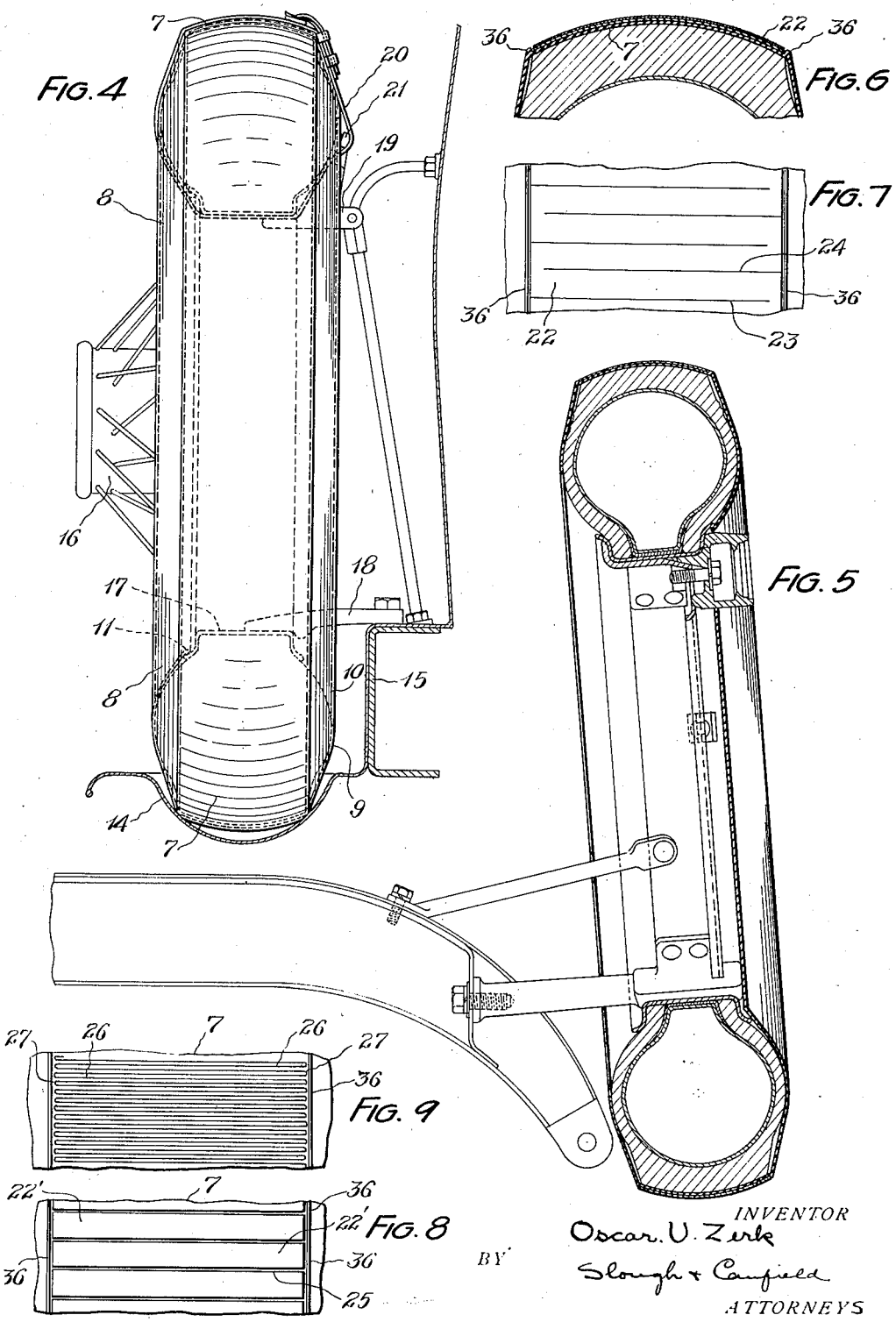

Patented Feb. 16, 1937

2,070,819

UNITED STATES PATENT OFFICE 2,070,819

TIRE COVER

Oscar U. Zerk, Cleveland, Ohio

Application July 23, 1931, Serial No. 552,635

8 Claims. (Cl. 150—54)

My invention relates generally to tire covers for spare tires of automobiles or other vehicles, and relates more particularly to tire covers which are resilient and flexible.

The tire covers of the prior art have usually been made of fabric or of metal. The earliest construction utilized oil cloth or other fabric covering having elastic or other adjustment means in one portion thereof adapted to contract the diameter of the cover to adjust the cover to the variation of the outside diameter of the tire upon wear since the diameter of the tire is reduced approximately one inch by wear during its life. These elastic or other common adjustment means have generally been unsuccessful in use since they cause unevenness upon the surface of the tire when a part of the outside portion of the tire cover is pulled over the circumference of the tire. The oil cloth or fabric construction further must be made of various pieces of material to secure a fit over the tire and this results in an uneven appearance. Also, due to the thinness of the texture, the uneven tread of the tire shows through the thin tire cover.

Another disadvantage of an oil cloth or fabric construction arises since the side portion of the tire cover generally surrounding the tire is unresilient and planular and does not adapt itself to the curvilinear side portion of the tire, with the result that a wide gap appears between the inside edges of the tire cover and the rim of the tire, and through said gap rain, dust, dirt, and other deleterious material enters and attacks the structure of both tire cover and tire.

To overcome the aforesaid disadvantages of the fabric tire covers of the prior art, metal tire covers are now used. These metal tire covers, however, although more attractive, also have a great many disadvantages, since they are susceptible to rust and corrosion upon exposure to moisture, and also upon the exertion of any force or pressure easily become indented. Since they are so easily dented, great skill and care must be taken in removing such a tire cover, since in changing a tire the spare tire has to be taken out of its permanent place in the fender well or on the rear of a car. The metal tire cover must in such an instance first be taken apart and removed from the spare tire, then carefully placed on the ground, then placed and assembled on the tire which was exchanged, and then the whole assembly placed back again in the fender well or on the back of the car. During the plurality of operations involved, denting of the sides of the surface of the tire cover very often occurs.

Moreover, when the spare tire is secured on the rear of the car and the metal tire cover placed thereover, and particularly where the rear spare tire extends beyond the rear bumpers or bumperettes, the metal tire cover received the greater shock imparted when a parked or slow moving car is bumped into by another car from the rear. Since light metal is employed, after the metal tire cover is dented, the original presentable round contour of the metal tire cover is lost, and the cover rendered less presentable than the tire itself.

In order to prevent damage by collision in this manner, many automobile owners leave the side metal cover off entirely from the spare tire and only use a metal cover covering the circumference of the spare tire. Because the side of a worn tire usually has a very worn appearance, this means is a makeshift at the best, especially since the side of the tire is now exposed to the elements, dust, dirt, etc., and is also now clearly exposed in the event of a collision. Many of the late model metal tire covers now only cover one side portion and the circumference of the tire, and not the side portion adjoining the body of the automobile. This also is obviously a disadvantage, since dirt, dust and small stones may readily penetrate to the surface between the cover and the tire.

Although it has also been proposed to apply rubber covers to vehicle spare tires for the purpose of protectively masking them, yet so far as I am aware such proposals have not achieved success because of the difficulty of applying the covers over a spare tire in a proper neat appearing manner and without injury to the cover or to the tire or both; also such attempts have required the use of exceedingly thin rubber of little or no protective value, or have required the use of auxiliary expedients to button, or otherwise secure the inner edges of the cover radially inwardly of the tire rim, which is of various dimensions measured radially inwardly and axially outwardly, and moreover such securing means must be operated with the rubber under varying degrees of tension. When under sufficient tension to maintain the masking portions of the cover in tensed non-wrinkled form the difficulty to securing the parts together around their meeting edges is so great as to be practically prohibitive. I am aware also that thick rubber covers have been proposed for such articles as steering wheels, but have not been successful, at least for the purpose of covering tires which are relatively large, because no proper securing means has been devised in connection therewith, and because they are not suitably formed to permit ready placement and displacement from the tire sought to be covered.

In order to overcome the disadvantages apparent in previously proposed tire covers, I have designed a substantially resilient tire cover made of rubber, requiring no auxiliary securing means, but which may readily be placed or displaced relatively to the tire, without injury to the cover or tire and which will efficiently maintain its tire masking and protective position in use, the provision whereof being one of the objects of my invention.

An object of my invention is to provide a one-piece resiliently flexible tire cover, which can easily be placed over a spare tire by even the most inexperienced operator.

Another object of my invention is to provide an improved resilient rubber tire cover of sufficient thickness to give a purposely smooth and even outer appearance and, since rubber can be surfaced to give a glossy appearance, wherein the appearance of the improved tire cover of my invention can scarcely be distinguished from an enameled metal cover.

Another object of my invention is to provide an improved tire cover which will always resume its original shape after the exertion of any force or pressure thereon.

Another object of my invention is to provide an improved tire cover which will not become permanently indented by the use of leather straps or metal clamps thereover or thereon.

Another object of my invention is to provide an improved tire cover which by reason of its resiliency cannot be defaced as readily as the surface of the tire covers of the prior art.

Another object of my invention is to provide an improved resilient tire cover having a preferably smaller inside diameter than the outside diameter of the tire which it covers, thus allowing the tire cover a close fit upon the tire irrespective of how little or how much the tire may be worn and its diameter decreased.

Another object of my invention is to provide an improved tire cover wherein the side portion or portions by reason of their inherent tension will conform in shape to any variations in the shape or the size of the tire, and thus make a close fit on substantially all exposed side portions of the tire, and on the rim of the tire, irrespective of the wear upon the tire and the reduction in the outside diameter thereof.

Another object of my invention is to provide an improved tire cover of sufficient resiliency to make a close fit upon the tire which it covers and yet which may be readily removed therefrom with a minimum of physical effort when desired by the operator.

Another object of my invention is to provide an improved tire cover which may be placed on the tire in any position.

Another object of my invention is to provide an improved tire cover constructed of a very light, resilient, bluish-gray rubber, or having a very high quality flossy metal powder or metal flakes of non-tarnishing quality, and of the appearance of polished chromium, vulcanized or otherwise firmly deposited on the outsides of the circumferential portion of the rubber tire cover, either of which will not from a short distance be readily discernible from an enameled or highly polished chromium tire cover.

Another object of my invention is to provide a resilient tire cover of the above description having the artistic and smooth glossy appearance of the metal tire cover, without its disadvantages.

Other objects of my invention and the invention itself will become apparent by reference to the following description of certain embodiments of my invention, and the invention itself, and the drawings illustrative of said embodiments wherein:

Fig. 1 illustrates a medial transverse sectional view of the improved tire cover of my invention disposed over a tire and associated wheel portion, upper and lower fragments of the wheel tire and cover being shown; also in dotted lines the normal unstressed form of parts of the tire cover are indicated;

Fig. 2 is a similar sectional view of another embodiment of my invention;

Fig. 3 shows an interior view of tire cover shown in Fig. 2 being a section taken as indicated from the line 3—3 shown on Fig. 2;

Fig. 4 is a side elevational view of the tire cover of Fig. 1 applied to a wire spoked wheel disposed in a so-called fender well, the well and associated parts of the car being shown in transverse section, certain interior parts of the cover, tire and rim being indicated by dotted lines, the cover being of the type shown in Fig. 1;

Fig. 5 is a medial transverse sectional view of a spare tire covering rim affixed to the rear of the vehicle together with the tire supported thereby and the tire cover therefor said tire cover being of the type shown in Figs. 1, 4 and 5;

Fig. 6 shows in transverse medial section a fragment of a tire and tire cover therefor, said tire cover being a third embodiment of my invention and comprising an outer concave convex annulus of preferably highly polished sheet metal made in an improved manner whereby slight resilient longitudinal elongation thereof may be effected;

Fig. 7 is a plan view of a fragment of the cover shown in Fig. 6;

Fig. 8 is a plan view of an alternative metal cover means for the circumference of the tire cover comprising a plurality of closely disposed transversely extending metal strips vulcanized to the outer circumferential surface of the rubber tire cover, which otherwise may be formed as in Figs. 1 or 2 or in the manners indicated in the subsequent figures of drawings illustrating other rubber cover embodiments of my invention;

Fig. 9 is a like view for a like purpose comprising a preferably continuous metallic wire extending alternately from one side to the other side of the circumferential portion of the tire cover, the bends at the edges of the said portion being very abrupt, said wire being preferably of stainless steel and applicable to any of the rubber cover embodiments illustrated herein;

Referring now to the drawings in all of which like parts are designated by like reference characters, at 3 I show end portions of certain of the spokes of an artillery type wheel comprising a felloe 2 upon which in any suitable manner a tire rim 1 is carried, said tire rim supporting in turn a tire 5, which is retained in position on said rim by a locking ring 4. The tire illustrated is of the usual straight side type and is provided with a circumferential tread portion 6. While the tire cover of my invention is subject to considerable variation in practice, the form illustrated in Fig. 1 comprises a circumferentially disposed annular tread cover portion 7 and a front wall 8 and a rear wall 9, said walls and tread cover portions being preferably integrally formed of sheet rubber, vulcanized to the non-stressed form indicated by broken lines for the tread cover portion 7' and broken lines 8' and 9' for the front and rear walls. The rear wall 9 extends inwardly to about the middle of the tire to provide an enlarged central opening 10, through which the means for mounting the wheel on the car may extend.

As indicated by the dotted lines 8' and 9' the lateral walls of the tire normally extend inwardly to a greater extent than is permitted by the larger size of the tire upon which the cover is to be placed and also the outer wall 8 terminates at the border of the central opening provided therein in a stiffening bead 11. When the cover is in place on the tire the bead resiliently engages the clamping ring 4 or other tire rim portion and thus seals the cover against the ingress of moisture, dirt, and the like. After the tire has become worn so as to reduce the diameter of the tire somewhat, the bead 11 may take up an inward radial position as illustrated at 11', and continue to effect a seal at this point.

The dotted line 7' illustrates the normal unstretched diametrical dimension of the tire cover before application to the larger tire, but it will be remembered that the entire cover is made of rubber material and is therefore subject to elongation to take the ultimate diametrical dimension indicated at 7 shown in Fig. 1.

The tire cover is longitudinally and transversely expanded during placement and when so expanded is stretched to provide a very smooth outer surface, and which as indicated at 12 bridges certain recessed portions 12' provided by the form of the tire making a smooth appearing cover throughout. The bead 11, being somewhat heavier than the rest of the wall 8, is less resilient than the wall 8, so that when the cover is placed on a tire, the bead resists stretching and exerts a strong inward radial pull on the tread cover portion 7, as well as on the wall 8 and helps to keep the tire cover smooth and free of wrinkles.

Whereas the inner wall 9 terminates medially at 13 of the tire proper, the outer wall 8 extends inwardly toward the tire rim to engage therewith and at the same time inwardly toward the longitudinal middle portion and inwardly toward the axis of the tire.

The wall 8 of course is the front wall and is the one exposed to view, whereas the wall 9 is not exposed to view and therefore is made much shorter in order to facilitate the initial placement of the tire cover on the tire, since the tire cover is of endless annular form and stretching of the wall 9 is required in order to place it over the tread portion of the tire.

The circumferential portion 7 of the tire cover is preferably made of a very light bluish-gray rubber, or is given a bright glossy finish in any desired color.

Figs. 4 and 5 illustrate two methods of mounting tires employing my improved cover illustrated in Fig. 1 to spare tires carried on vehicles, Fig. 4 showing a side fender well mounting for a wheel which may be a wire spoked wheel, the fender well being shown in transverse section at 14, and is carried by the channel frame element 15 of the automobile. The hub of the wheel is shown at 16 and the wheel rim by dotted lines at 17 and is illustrated as being mounted upon arms 18 and 19 extending inwardly through the central aperture 10 of the tire cover wall 9.

One or more securing straps 20 may be provided extending entirely over the tire cover and a fork 21 of the arm 19 for tightly securing the wheel to the mounting arms.

In this position of the tire the front wall 8 and the circumferential wall 7 are presented to view from outside of the vehicle, while the inner wall 8 is partially viewable from the interior of the vehicle. All portions of the cover exposed to view are preferably given a bright polished appearance, the circumferential portion 7 having preferably a polished metallic surface and the outer wall 8 being given a glossy black finish or the like.

In some cases I may reverse this arrangement of surfaces, giving the circumferential surface 7 the black, blue, green or the like polished color effect, and whereas the outer wall 8 may be given the metallic finish.

In Figs. 6 and 7 I show in transverse section and in plan a metallic annulus 22, which may be vulcanized to the circumferential surface 7 of the cover to give it a bright metallic glossy appearance, the metallic annulus 22 being in the form of a strip of sheet metal having preferably a chromium or like plated outer surface and slit inwardly at 23 and 24 alternately from opposite sides of the strip to nearly the opposite edge of the strip, whereby when such a slitted strip is vulcanized onto the circumferential surface of the tire cover and the tire cover is longitudinally strapped in applying it to a larger tire tread surface, the edges of the strip formed at the splits may be separated to permit longitudinal elongation of this portion of the cover, and in such case the split separated portions will when closely examined present a split separated V appearance, although the separation will be so slight in practice at each split as not to be readily noticeable.

Fig. 9 illustrates another means of giving the metallic luster to the circumferential portion of the tire cover wherein a metallic wire 26 is disposed in folded form extending back and forth from one side of the circumferential portion 7 of the tire cover to the other in alternate directions with the sharp bends at 27 at the ends and is vulcanized to the outer surface of the tire in such position.

This wire may be of stainless steel or may be chromium, nickel or otherwise plated to give the desired metallic luster.

Figs. 2 and 3 illustrate another embodiment of my invention wherein the tire cover is provided with an outer wall extending inwardly to its central aperture 29, the bordering portions 30 of the front cover wall shown at 8x being substantially straight and preferably engaging the rim 28, the rear wall 9x being substantially like that shown in Fig. 1.

The tread portion is provided with an outer circumferential layer 7x of rubber or any other suitable cover material, and in a preferred embodiment of my invention I prefer to make this outer annular layer of a nearly white or bluish-gray rubber material, the balance of the cover having a polished black appearance, the two superposed layers of rubber forming the circumference 7 of the tire cover being vulcanized together.

Also as illustrated in Fig. 3, the inner surface of the circumferential portion of the tire cover shown in Fig. 2 may be provided with transversely extending parallel ribs 38 on the inner surface of the cover 7x, and preferably also may be provided with inwardly extending lugs 39 disposed in spaced relation to the ends of the ribs 38 and laterally thereof, whereby the tire cover may be reinforced in portions overlying the tread of the tire and will also be prevented from distortion whereby portions of the cover will be depressed into recesses, ribs and the like formed for traction purposes on the tread portion of the tire. The annular corner edges 40 of the tire tread are preferably received between the lugs 39 and the ribs 38, whereby the cover is maintained in properly rounded formation as illustrated in Fig. 2.

In the different embodiments of my invention, such for instance as that shown in Fig. 1, the front and rear walls 8 and 9, being integrally formed by a molding process with the circumferential portion 7 of the cover are of such thickness as to be relatively stiff though resilient and are preformed to extend inwardly towards the longitudinal middle plane of the tire, so that when the cover is stretched over the tire beside the longitudinal stretching of the cover, the walls, principally the wall 8, will be distorted from its normal inward position to a more outward position against the inherent resiliency of the material of which it is made, and the said front portion reacting against the deflecting tire and rim portion engaging it will press against the same with considerable force and this force is intensified by the longitudinal stretching of the entire tire cover.

The provision of a rounded bead 11 at the inner edge of said front wall 8 increases the resistance to the longitudinal stretching of this particular tire portion, whereby the diametrical dimension of the central opening of the tire cover bordered by said bead is neither enlarged nor diminished to an objectionable degree during the action of placement of the cover on or removal of the cover from the tire.

In the embodiment of my invention shown in Fig. 6 where a metallic annulus 22 is disposed over the circumference of the rubber cover being vulcanized thereto, upstanding annular flanges 36 at each side of the circumferential portion 7 of the rubber cover, abut against the lateral edges of the metal annulus, to give a smooth finished superficial appearance to the cover at the lateral borders of said metal annulus.

It will be understood also that with reference to Fig. 8 where I have shown a plurality of closely adjacent metal strips 22' extending between the said border flanges 36 to provide a metallic appearing circumferential surface for the cover, that the number of the metallic segments 22' may be varied very extensively and I contemplate sometimes providing relatively few of the segments in certain embodiments of my invention contemplated herein.

Having thus described my invention, I am aware that numerous and extensive departures may be made from the embodiments herein illustrated and described, but without departing from the spirit of my invention.

I claim:

1. As an article of manufacture, a rubber tire cover comprising a circumferential portion and a zigzagged metallic element extending in alternately different directions from one side of said portion to the other to provide substantially approximately parallel lengths of metallic material, affixed to said portion, said zigzag element comprising a flat strip of metal extending circumferentially over the said rubber portion and slitted at intervals from opposite sides of the strip to near the other side.

2. As an article of manufacture, a rubber tire cover comprising a circumferential portion and a zigzagged metallic element extending in alternately different directions from one side of said portion to the other to provide substantially approximately parallel lengths of metallic material, affixed to said portion.

3. As an article of manufacture, a tire cover comprising a tread covering portion and side wall covering portions, and inwardly extending projections formed on the inner surface of the cover adapted to engage the tire surface, to reinforce the cover and spacing portions of said cover from the tread of the tire, some of said projections comprising a series of spaced laterally extending ribs extending over the periphery of the tire tread and engageable therewith and the other projections being formed on the inner surface of said side wall covering portions, the first series of projections in cooperation with the second series of projections making gripping contact on opposite sides of the tire tread edges to clutch the cover to said tire tread edges.

4. A tire cover composed substantially entirely of resilient flexible rubber material and comprising a tread covering portion, and side wall covering portions formed integral with said tread covering portion, said side wall covering portions extending inwardly in a generally radial direction, one of such portions extending inwardly to a much greater distance than the other such portion and adapted to mask substantially all of one of the side walls of a tire of appropriate size to which the cover is applied, the other such portion extending radially inwardly a relatively shorter distance and being sufficiently resiliently stretchable to permit its being snapped over the tire tread portion and to reactively make pressure engagement against the outermost border portion of the other side wall of the engaged tire, said tread and side wall covering portions being substantially in a form of a continuous inwardly channeled annulus, the tire tread contacting covering portion being normally, before application to a tire of appropriate size, of slightly less diametrical size than the outside diameter of the tire tread portion onto which it is to be fitted, the said wall masking side portion having its inner border portion reinforced and of such dimensions relative to the said tire, that when in place thereon it will be subjected to strong longitudinally directed stretching stress whereby it will communicate a radial stretching pull to said tread covering portion through the intermediate resiliently stretchable side wall masking portion, to prevent wrinkling or folding thereof, during use, and inwardly extending projections formed on the inner surface of the cover adapted to engage lateral edge portions of the tire surface to restrain lateral displacement of the cover relative to the tire tread.

5. A cover for masking and protecting spare tires comprising a substantially all-rubber tire covering element of annular form whereof transverse sections are substantially of J-form, providing by the longer arm thereof a masking portion for an outer side of a tire covered thereby, its transversely extending intermediate portion providing a tire tread masking portion and the short arm thereof providing a retaining portion engageable with a lateral surface of the inner tire side, the outer tire side masking portion being so formed and positioned that when in place it effects resiliently constrained pressure directed inwardly against the outer side surface of the tire to which the cover is applied, said tire tread masking portion overlying but substantially spaced outwardly of the intermediate portion of the covered tire tread surface and tire side engaging projections formed integrally with the cover and extending inwardly of its inner wall near the tread masking portion of the cover.

6. An annular one piece spare tire cover composed of rubber and shaped to substantially conform to and cover the tread and outer side face of a spare tire, said cover having a circumferentially continuous inturned short inner margin which is sufficiently elastic to stretch over the tread of the tire when the cover is placed on or removed from the tire and which overlies the outer portion of the inner side face of the tire to retain the cover in place on the tire.

7. A tire cover composed substantially entirely of resilient flexible rubber material and comprising a tread covering portion, and side wall covering portions formed integral with said tread covering portion, said side wall covering portions extending inwardly in a generally radial direction, said side wall covering portions being formed initially and normally closer together than the side surfaces of the tire to which the cover is to be applied, one of such portions extending inwardly to a much greater distance than the other such portion and adapted to mask substantially all of one of the side walls of a tire of appropriate size to which the cover is applied, the other such portion extending radially inwardly a relatively shorter distance to be sufficiently resiliently stretchable to prevent it being snapped over the tire tread portion and to reactively make pressure engagement against outermost border portion of the engaged tire other side wall, said tread and side wall covering portions being substantially in the form of a continuous inwardly channeled annulus, the tire tread contacting covering portion being normally, before application to a tire of appropriate size, of slightly less diametric size than the outside diameter of the tire tread portion onto which it is to be fitted, the said wall masking inside portion having its inner border portion reinforced and of such dimension relative to the said tire, that when it is placed thereon it will be subjected to strong longitudinally directed stretching stress whereby it will communicate a radial stretching pull to said tread covering portion through intermediate resiliently stretchable side wall masking portions, to prevent wrinkling or folding thereof during use, said tire cover having inwardly extending projections formed on the inner surface of the cover adapted to engage lateral edge portions of the tire surface to restrain lateral displacement of the cover relative to the tire tread.

8. A tire cover composed substantially entirely of resilient flexible rubber material comprising a tread covering portion, and side wall covering portions formed integral with said tread covering portion, said side wall covering portions extending inwardly in a generally radial direction and being formed initially and normally disposed closer together than the side surfaces of the tire to which the cover is to be applied, one of such portions extending inwardly to a much greater distance than the other such portion and adapted to mask substantially all of one of the side walls of a tire of appropriate size to which the cover is to be applied, the other such portion extending radially inwardly a relatively shorter distance and being sufficiently resiliently stretchable to permit its being snapped over the tire tread portion and to reactively make pressure engagement against outermost border portions of the engaged tire other side wall, said tread and side wall covering portions being substantially in the form of a continuous inwardly channeled annulus and the tire tread contacting covering portion being normally, before application to a tire of appropriate size, of slightly less diametrical size than the outside diameter of the tire tread portion onto which it is to be fitted, the said wall masking side portion having its inner border portion reinforced and of such dimension relative to the said tire, that when it is placed thereon it will be subjected to strong longitudinally directed stretching stress whereby it will communicate a radial stretching pull to said tread covering portion through intermediate resiliently stretchable side wall masking portions to prevent wrinkling or folding thereof during use, and inwardly and laterally extending ribs formed on the inner surface of the cover adapted to engage lateral edge portions of the tire surface to restrain lateral displacement of the cover relative to the tire tread.

OSCAR U. ZERK.